United States Patent
Lea et al.

(10) Patent No.: US 10,684,878 B1
(45) Date of Patent: Jun. 16, 2020

(54) VIRTUAL MACHINE MANAGEMENT

(71) Applicant: GoDaddy Media Temple Inc., Culver City, CA (US)

(72) Inventors: Christopher Lea, Venice, CA (US); Michael Johnson, Portland, OR (US); Demian Sellfors, West Hollywood, CA (US)

(73) Assignee: GoDaddy Media Temple Inc., Culver City, CA (US)

( * ) Notice: Subject to any disclaimer, the term of this patent is extended or adjusted under 35 U.S.C. 154(b) by 450 days.

(21) Appl. No.: 15/423,163

(22) Filed: Feb. 2, 2017

Related U.S. Application Data

(63) Continuation of application No. 14/044,774, filed on Oct. 2, 2013, now Pat. No. 9,596,189.

(51) Int. Cl.
*G06F 9/455* (2018.01)

(52) U.S. Cl.
CPC .. *G06F 9/45558* (2013.01); *G06F 2009/4557* (2013.01); *G06F 2009/45591* (2013.01); *G06F 2009/45595* (2013.01)

(58) Field of Classification Search
CPC ............ G06F 11/3433; G06F 11/3466; G06F 17/303; G06F 2009/4557; G06F 2201/815; G06F 2201/87; G06F 9/45533; G06F 9/4856; G06F 9/5077
See application file for complete search history.

(56) References Cited

U.S. PATENT DOCUMENTS

| | | | | |
|---|---|---|---|---|
| 9,596,189 B1* | 3/2017 | Lea | ........................ | G06F 16/214 |
| 2006/0190714 A1* | 8/2006 | Vaszary | ................. | G06F 9/5083 713/100 |
| 2006/0195715 A1* | 8/2006 | Herington | .............. | G06F 9/5077 714/4.2 |
| 2010/0242045 A1* | 9/2010 | Swamy | ................... | G06F 9/455 718/104 |
| 2013/0024484 A1* | 1/2013 | Banerjee | ................. | G06F 16/28 707/822 |
| 2013/0325906 A1* | 12/2013 | Qiu | ........................ | G06F 16/214 707/803 |
| 2014/0082165 A1* | 3/2014 | Marr | ..................... | G06F 9/5044 709/222 |

* cited by examiner

*Primary Examiner* — David R Lazaro
(74) *Attorney, Agent, or Firm* — Greenberg Traurig, LLP

(57) ABSTRACT

A migration management service monitors the resource usage or other behavior factors related to virtual machine instances implementing database functionality and hosted on various physical computing devices. Based on the resource usage associated with the implementation of the database functionality and other behavioral factors, the migration management service identifies a set of target hosted virtual machine instances for possible migration. The migration management service can further identify and prioritize from the set of target hosted virtual machine instances which hosted virtual machine instances may have a greater likelihood to impact the execution of other hosted virtual machine instances being hosted in the same physical computing device. Based on the identification and prioritization, the migration management service can then cause the migration of one or more hosted virtual machine instances unto on a different physical computing device.

19 Claims, 6 Drawing Sheets

VIRTUAL MACHINE MANAGEMENT

CROSS-REFERENCE TO RELATED APPLICATIONS

This application is a continuation of U.S. patent application Ser. No. 14/044,774 entitled "VIRTUAL MACHINE MANAGEMENT" and filed on Oct. 2, 2013.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machine instances that appear and operate as independent computing devices to users of a data center. With virtualization, the single physical computing device can create, maintain, delete or otherwise manage virtual machine instances in a dynamic matter. In turn, users can request computer resources from a data center, including single computing devices or a configuration of networked computing devices, and be provided with varying numbers of virtual machine resources.

For data centers hosting virtual machines instances for the general public, one or more physical computing devices within a data center may host virtual machine instances that are associated with different and distinct customers. Because all of the hosted virtual machine instances are associated with the same common physical computing device resources, it may be possible that the execution of software applications, software code, etc. within a first hosted virtual machine instance can affect the availability or performance of other hosted virtual machine instances.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of virtual machine instances. Specifically, systems and methods are disclosed which facilitate migration of virtual machine instances between physical computing devices in a data center. In one aspect, a migration management service monitors the resource usage or other behavior factors related to virtual machine instances implementing database functionality and hosted on various physical computing devices. Based on the resource usage associated with the implementation of the database functionality and other behavioral factors, the migration management service identifies one or more target hosted virtual machine instances for possible migration. The migration management service can further identify and prioritize from the set of target hosted virtual machine instances which hosted virtual machine instances may have a greater likelihood to impact the execution of other hosted virtual machine instances being hosted in the same physical computing device. Based on the identification and prioritization, the migration management service can then cause the migration of data associated with one or more hosted virtual machine instances unto on a different physical computing device. For example, the migration management service can cause the reservation/designation of a different dedicated physical computing device for hosting the migrated data.

Figure 1:
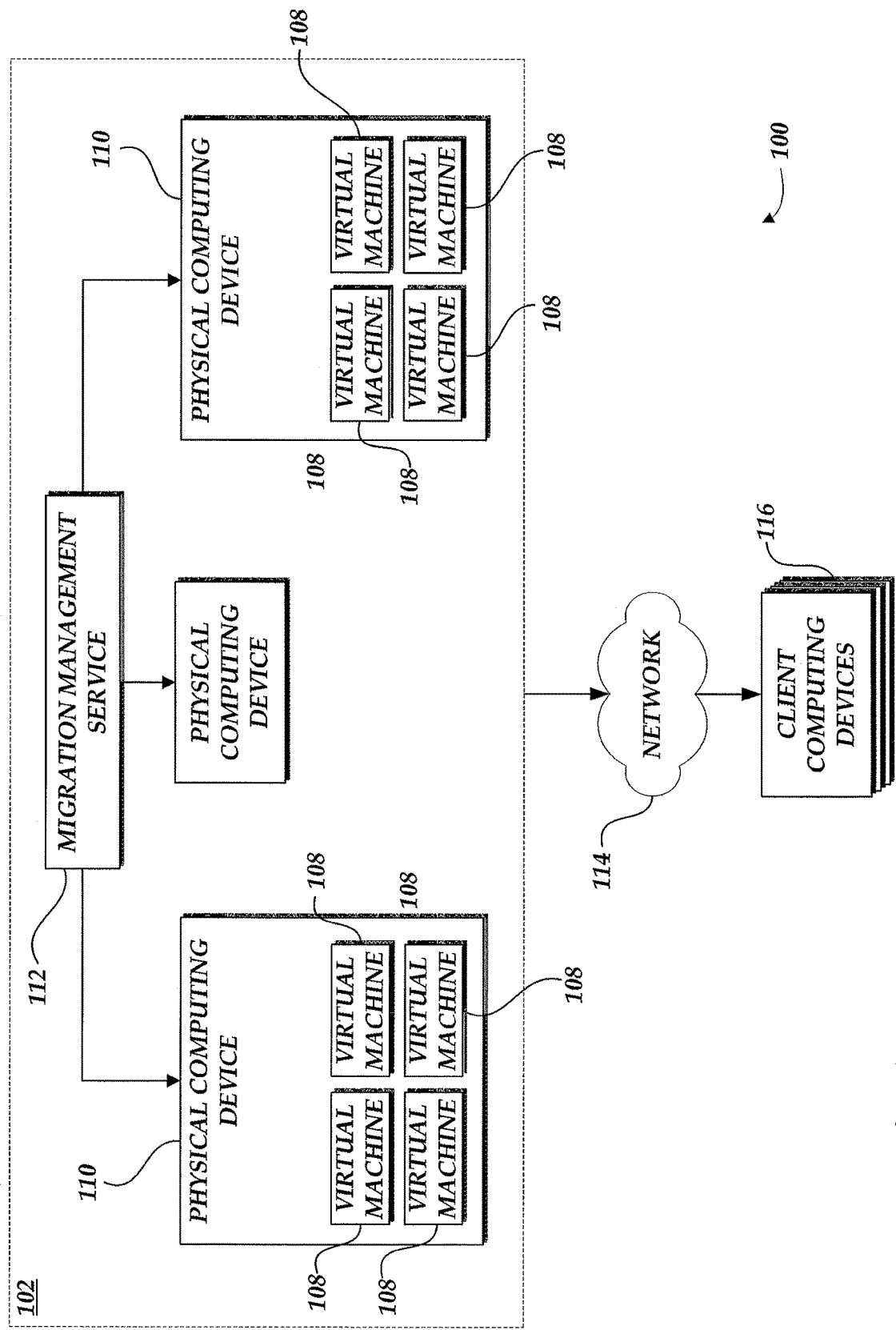
FIG. 1 is a block diagram illustrating an embodiment of a virtual network having physical computing devices including hosted virtual machine instances and a migration management service.

FIG. 1 is a block diagram illustrating an embodiment of a migration management environment 100. The migration management environment 100 can include a hosting service provider 102 that hosts services/functions on behalf of one or more customers. The host service provider 102 can provide multiple physical computing devices 110. Some of the physical computing device 110 can be configured to host multiple virtual machine instances 108. At least some of the virtual machine instances 108 or physical computing devices 110 may be provisioned to provide a variety of different desired functionalities depending on the needs of the hosting service provider 102. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center.

One skilled in the relevant art will appreciate that the hosting service provider 102 is logical in nature and can encompass host computing devices 110 from various geographic regions. Additionally, although the host computing devices 110 will be discussed with regard to hosted virtual machine instances 108, one or more of the host computing devices may be physical computing devices configured to provide specified functionality in the hosting service provider 102 without hosting virtual machine instances, generally illustrated as host computing device 110 without virtual machine instances 108 in FIG. 1. Accordingly, reference in the illustrative examples and embodiments to host computing devices 110, a target computing device, can include host computing devices hosting virtual machines 108 or not hosting virtual machine instances.

In communication with the physical computing devices is a migration management service 112. Illustratively, the migration management service 112 may monitor metrics corresponding to one or more individual hosted virtual machine instances 108. As will be explained in greater detail below, in one embodiment, the migration management service 112 utilizes the monitored metrics to identify one or more hosted virtual machine instances 108 to migrate to a different physical computing device 110. One skilled in the relevant art will appreciate that the migration of a physical computing device 110 or hosted virtual machine instance 108 does not necessarily includes the migration of all aspects of the targeted, hosted virtual machine instance. Rather, in some embodiments, migration of a targeted, hosted virtual machine instance may involve the migration of the data utilized or executed by the targeted, hosted virtual machine instance to another instantiated hosted virtual machine instance without migration of the targeted, host virtual machine instance itself. Accordingly, reference to the migration of a hosted virtual machine instance or aspects of a virtual machine instance does not necessarily include the migration of the underlying hosted virtual machine instance 108 being hosted on a physical computing device 110 or the physical computing device.

Connected to the virtual network 102 via a communication network 114 are one or more client computing devices 116. Illustratively, the client computing devices 116 correspond to any one of a variety of computing devices, such as desktop computing devices, mobile devices, tablet devices, embedded devise, and the like, that are configured to interact with one or more of the hosted virtual machine instances via the communication network 114. By way of example, the communication network 114 may be, for instance, a wide area network (WAN), a local area network (LAN), or a global communications network.

In one embodiment, the hosted virtual machine instances 108 may correspond to database functionality or database services, such as a database server hosted on a virtual machine instances. Accordingly, in this embodiment, the migration management service 112 may monitor metrics related to of one or more individual hosted virtual machine instances 108 providing database functionality. For example, the monitored metrics may correspond to the determination of the type and frequency of database queries received by a hosted virtual machine instance. In another example, the monitored metrics may correspond to the origination of database queries. In other some embodiments, the monitored metrics may correspond to utilization or consumption of physical computing device resources by the execution of the hosted virtual machine instances, including, but not limited, to memory usage, hard disk drive (HDD) usage, central processing unit (CPU) usage, graphics processing unit (GPU) usage, network interface usage or network resources. Though these resources are described for illustrative purposes, one of ordinary skill in the art will appreciate that the migration management service 112 may monitor any resources available to the hosted virtual machine instances 108.

Additionally, in further embodiment, the migration management service 112 may monitor shared resources of multiple hosted virtual machine instances 108. These shared resources may correspond to any resource utilized by more than one physical computing device 110 such shared network resources, shared CPU usage, shared power usage, and shared memory usage.

With respect to FIG. 2, various components of the migration management service 112 of FIG. 1 will be described. Illustratively, the migration management service 112 may be associated with computing resources such as central processing units and architectures, memory (e.g., RAM), mass storage or persistent memory, graphics processing units, communication network availability and bandwidth, etc. Generally, however, the migration management service 112 may include one or more processing units, such as one or more CPUs. The migration management service 112 may also include system memory, which may correspond to any combination of volatile and/or non-volatile storage mechanisms. The system memory may store information that provides an operating system component, various program modules, program data or other components. The migration management service 112 performs functions by using the processing unit(s) to execute instructions provided by the system memory. The migration management service 112 may also include one or more types of removable storage and one or more types of non-removable storage. Still further, the migration management service 112 can include communication components for facilitating communication via wired and wireless communication networks, such as communication network 114.

Figure 2:
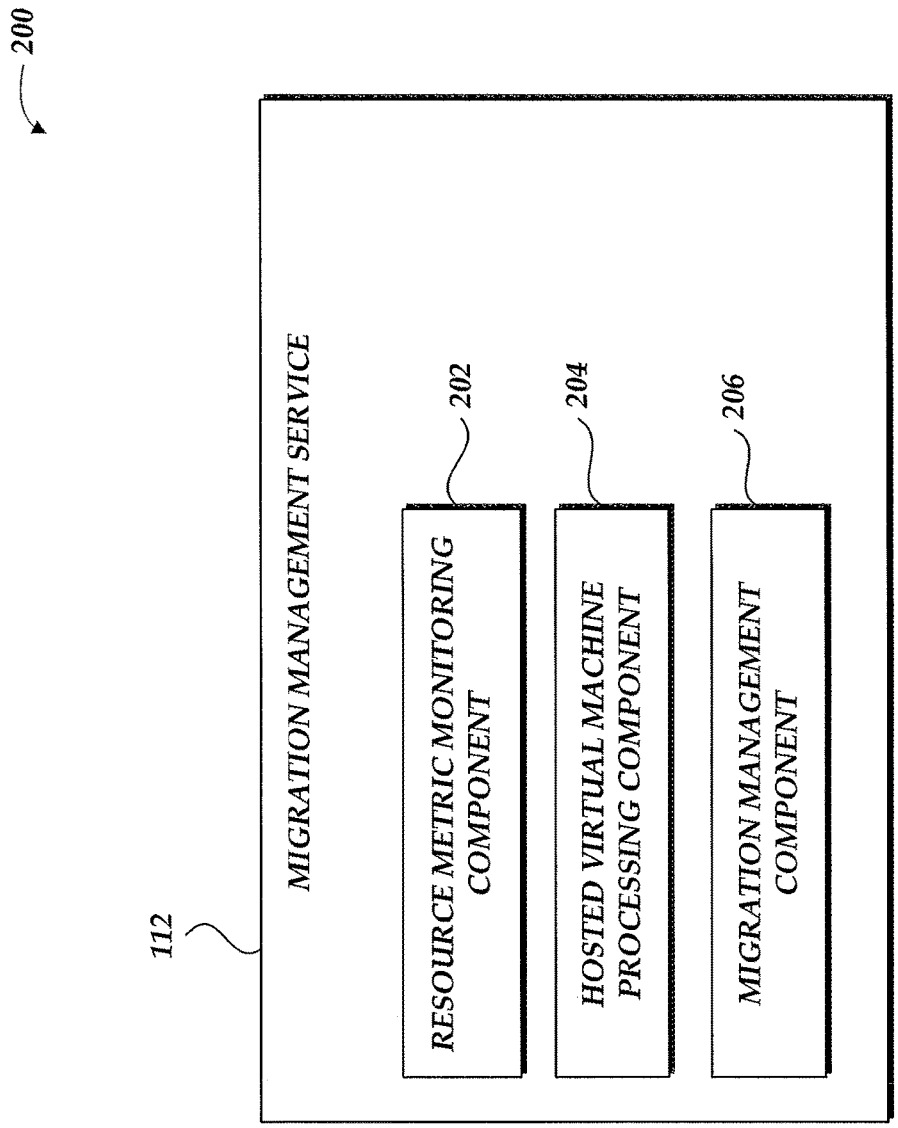
FIG. 2 is a block diagram illustrative of a migration management service having a resource monitor component, a hosted virtual machine processing component, and a migration management component utilized in the virtual network of FIG. 1.

As illustrated in FIG. 2, the migration management service 112 can include, among other hardware or software components, a resource monitor component 202, a hosted virtual machine processing component 204, and a migration management component 206. Illustratively, the resource monitor component 202 is operable, at least in part, to monitor the resource usage of virtual machine instances. As previously described, in one embodiment, the monitored metrics for hosted virtual machine instances implementing database functionality can include, but is not limited to, determination of the type and frequency of database queries received by a hosted virtual machine instance.

The hosted virtual machine processing component 204 may utilize the monitored metrics to identify a set of hosted virtual machine instances 108 that are targets for migration. Additionally, the hosted virtual machine processing component 204 may also prioritize one or more the target hosted virtual machine instances based on a determined likelihood that the hosted virtual machine instances may affect the performance of other hosted virtual machine instances 108 associated with a common physical computing device 110. In some embodiments, the hosted virtual machine processing component 204 may further be utilized to be responsive to subsequent requests to re-integrate any hosted virtual machine instances 108 that have been migrated. For example, a client computing device 102 may transmit a request identifying one or more hosted virtual machine instances 108 that have been configured to address a possible fault/error or that may have been unnecessarily migrated.

With continued reference to FIG. 2, the migration management component 206 may be utilized to cause the migration of data associated with one or more of the targeted and prioritized hosted virtual machine instances 108. As will be explained below, the migration of the hosted virtual machine instances can include the generation of binary copies of the data associated with target hosted virtual machine instance for incorporation into a new hosted virtual machine instance 108.

Illustratively, the resource monitor component 202, the hosted virtual machine processing component 204 and the migration management component 206 may be hosted by on a single physical computing device 110. In some embodiments, the resource monitor component 202, the hosted virtual machine processing component 204, and the migration management component 206 may function separately, for instance hosted within various operating systems or physical computing devices 110.

Figure 3A:
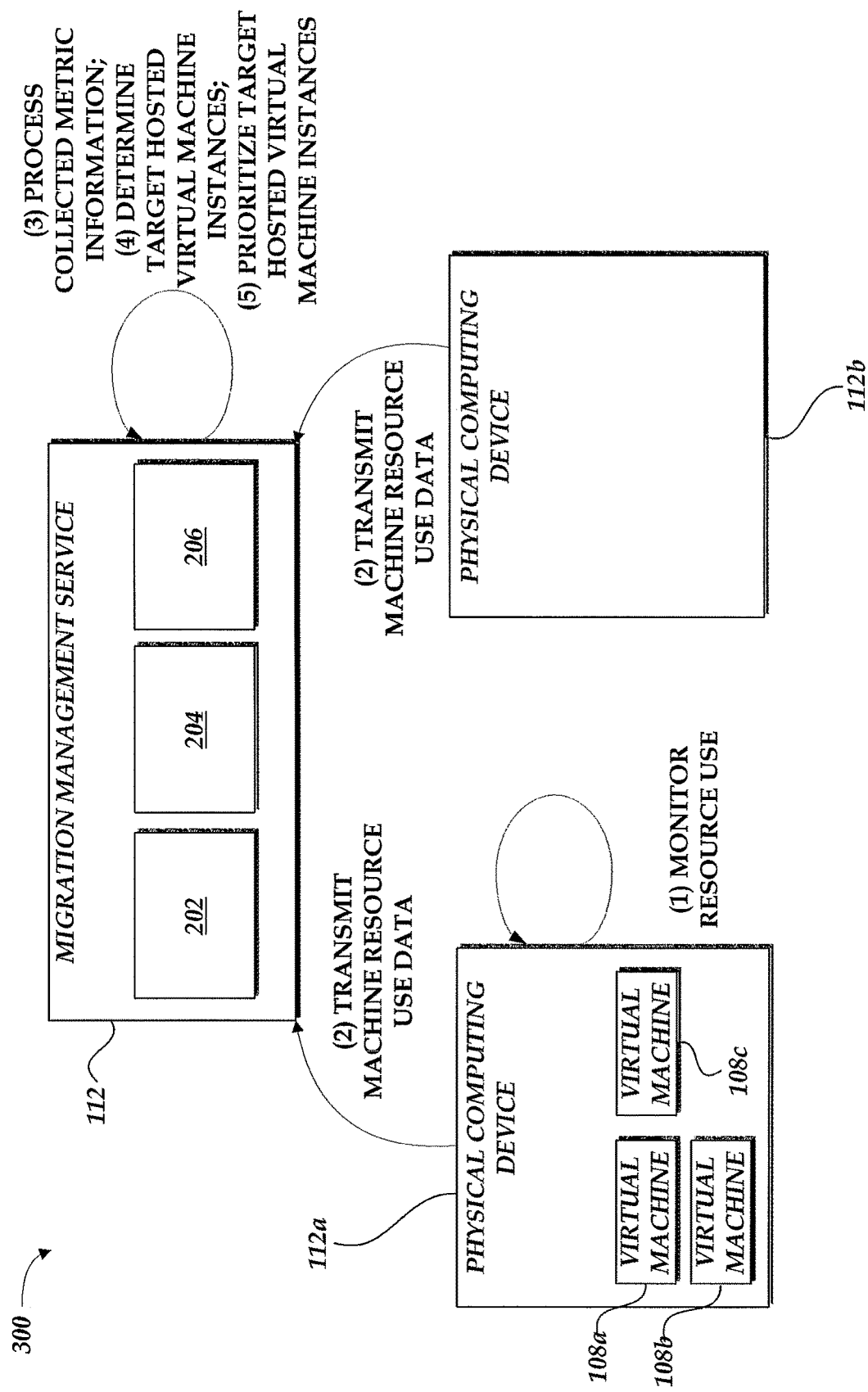
FIGS. 3A-3C are simplified block diagrams of the virtual network of FIG. 1 illustrating the migration of virtual machine instances based on processing metrics associated with the hosted virtual machine instances.
Figure 3B:
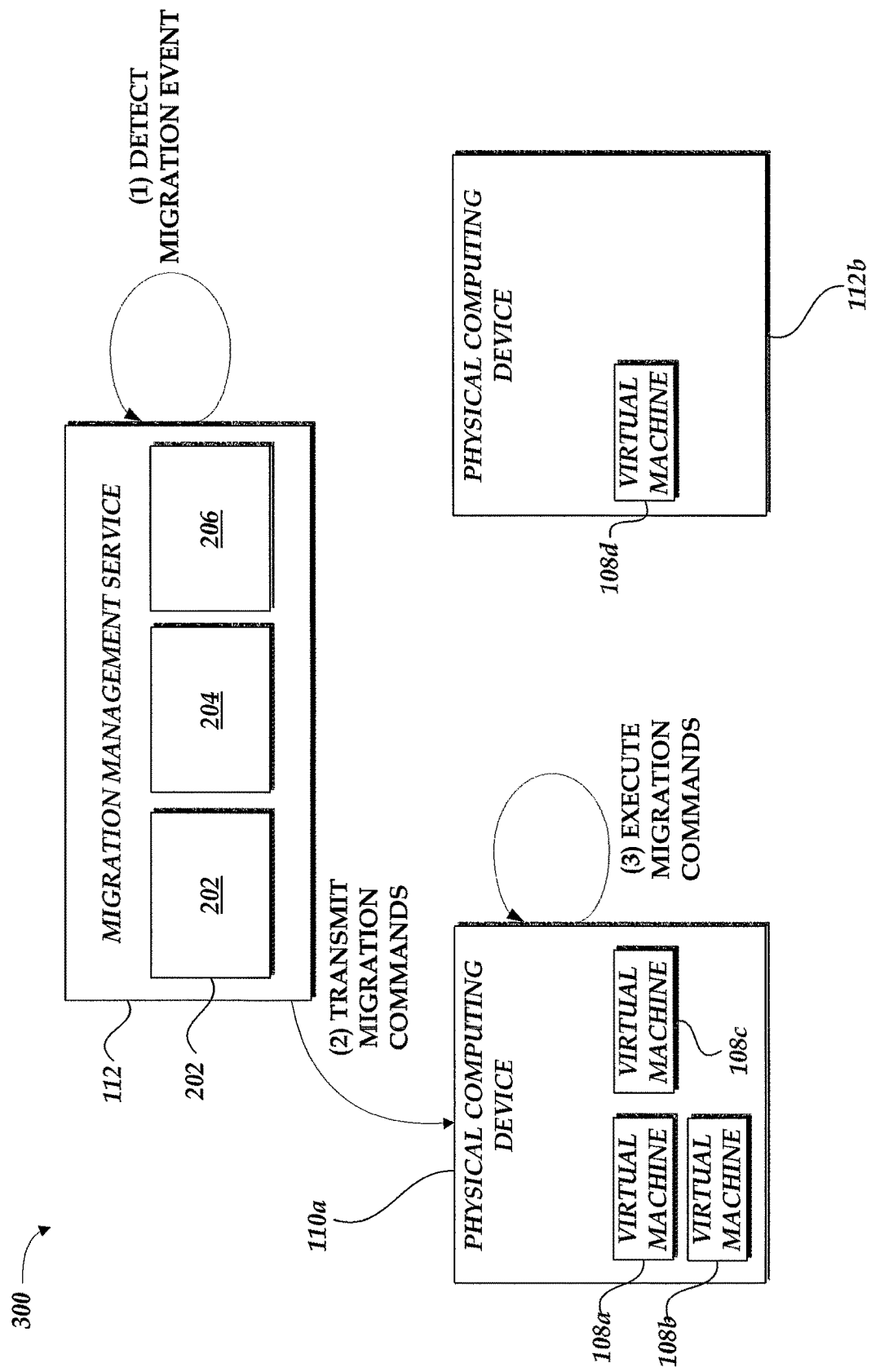
Figure 3C:
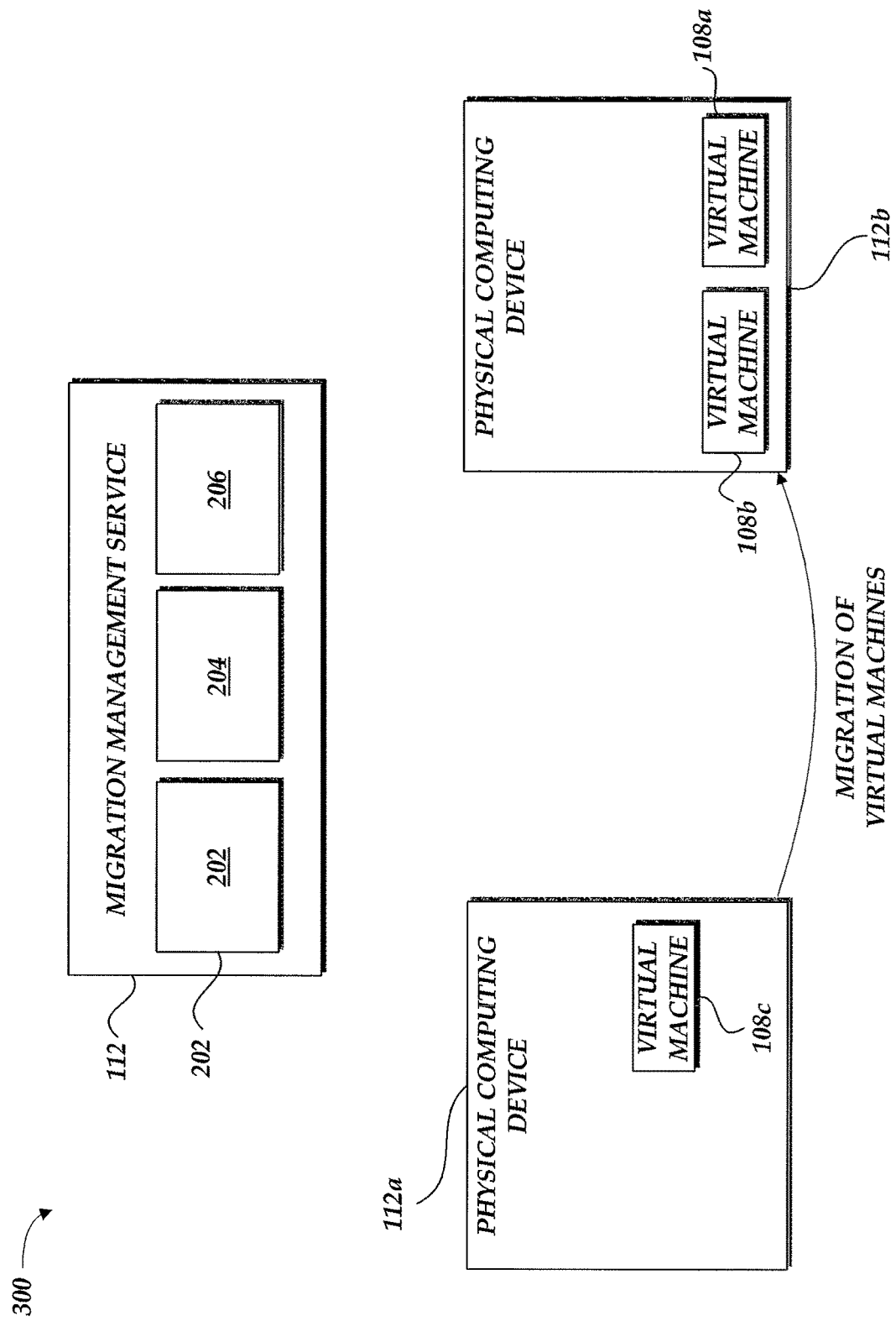

With reference now to FIGS. 3A-3C, simplified block diagrams are shown illustrating the process of managing the migrating one or more hosted virtual machine instances 108 by the migration management service 112 of FIG. 1. As illustrated in FIG. 3A, performance metrics related to the utilization of hosted virtual machine instances 108 are recorded at (1). For example, the physical computing devices 110 may include one or more controls or processes that record the activity of database functionality provided by each hosted virtual machine instance 108. As described above, the monitored metrics may correspond to the determination of the type and frequency of database queries received by a hosted virtual machine instance. In another example, the monitored metrics may correspond to the origination of database queries. In a further example, the monitored metrics can also include tracking information related to the utilization of physical computing device resources, such as network resources, processor resources, memory resources and the like. One skilled in the relevant art will appreciate however, that additional or alternative monitored resources may be utilized.

At (2), the physical computing devices 110 transmit the recorded metric information to the migration management service 112. The migration management service 112 obtains the recorded hosted virtual machine metric information. At (3), the migration management service 112 can process the received hosted virtual machine metric information. In one aspect, the migration management service 112 can collect additional information related to resource consumption of the physical computing device 110 hosting the hosted virtual machine instances. In another aspect, the migration management service 112 can further identify and associate other contextual information associated with the hosted virtual machine instance(s) 108, such as customer identifiers, geographic or network identifiers, time of day, historical behavior, performance parameters or identifiers (e.g., minimum service level agreements), etc. Still further, in another aspect, the migration management service 112 can obtain additional information related to other hosted virtual machine instances hosted on the same physical computing device 110 or otherwise sharing resources, such as memory, power, processing components, data sources/services, etc. For example, the additional information can be utilized by the migration management service 112 to form or establish base line performance information. One skilled in the relevant art will appreciate that additional processing may also be possible.

At (3), the migration management service 112 identifies a subset of hosted virtual machine instances that may be target for possible migration. In one embodiment, the migration management service 112 can identify the subset of the hosted virtual machine instances based on applying one or more thresholds related to the collected metric information. For example, the migration management service 112 can identify any hosted virtual machine instances 108 that are processing above a threshold number of database queries (over a defined time). In another example, the migration management service 112 can identify any hosted virtual machine instances 108 that have processed any database queries exceeding a size limits (e.g., number of indexes, number of rows scanned), latency or processing time limits, server load limits, and the like. In a further example, the migration management service 112 can identify any hosted virtual machine instances that exceeded a limit as to a number of simultaneous connections. In a still a further example, the migration management service 112 can identify any hosted virtual machine instances 108 that exceed averaged number of database queries or latency times over a defined time. In yet another example, the migration management service 112 may utilize contextual information to form the identified set of hosted virtual machine instances 108. Illustratively, the migration management service 112 may utilize customer identifiers or geographic identifiers associated with hosted virtual machine instances 108 to form, at least in part, the identified set of hosted virtual machine instances 108. In other embodiments, the migration management service 112 may not filter any hosted virtual machine instances. One skilled in the relevant art will appreciate that additional or alternative thresholds or other filtering criteria may also be applied.

With continued reference to FIG. 3A, after identification of the set of hosted virtual machine instances that may be targeted for migration, at (4), the migration management service 112 processes the set to generate a prioritized set of target hosted virtual machine instances. In one aspect, the prioritization of the hosted virtual machine instances may be based on comparison of recorded metric information. For example, the migration management service 112 may apply a separate threshold for identifying target hosted virtual machine instances for migration. In another aspect, the prioritization of the set of target hosted virtual machine instances may be based on consideration of additional information, such as customer identification, geographic or location identifiers, service level agreements, etc. For example, the migration management service 112 may prioritize hosted virtual machine instances that are associated with a customer that has previously been identified or subjected to migration(s) or that may have previously violated terms of a service level agreement.

In another example, the migration management service 112 may prioritize hosted virtual machine instances based on agreed upon service level agreements, including a maximum amount of resource usage agreed to by the customer. In a further example, the migration management service 112 may prioritize hosted virtual machine instances that are associated with service level agreements for other hosted virtual machine instances. In this example, a hosted virtual machine instance that is consuming resources in a manner that would cause the migration management service 112 to violate service level agreements provided to other hosted virtual machine instances 108 on the same physical machine may be targeted for migration.

In another embodiment, the migration management service 112 can incorporate additional manual input regarding the prioritization of the targeted hosted virtual machine inputs. In this embodiment, the migration management service 112 may generate interfaces related to the set of target hosted virtual machines instances to obtain input from users regarding prioritization. For example, the migration management service 112 can generate, or cause to be generated, an interface that allows manual manipulation of one or more of the hosted virtual machine instances via an input device, such as mouse, keyboard, touchscreen, etc.

With reference now to FIG. 3B, a simplified block diagram illustrating a migration event is depicted. As illustrated in FIG. 3B, at (1), the migration management service 112 determines to migrate data associated with one or more hosted virtual machine instances 108 identified in the prioritized set of hosted virtual machine instances. The determination by the migration management service 112 of when to migrate may occur for a variety of reasons. For example, the migration may occur upon completion of the prioritization of the set of hosted virtual machine instances, upon the exceeding performance criteria (e.g., total server load or a threshold number of hosted virtual machine instances exceeding performance thresholds), or upon satisfaction of time criteria. In another embodiment, the migration management service 112 may also initiate the migration of the hosted virtual machine instances responsive to a request or command from a user, such as a system administrator.

Once the parameters for the migration of the virtual machine instances are determined in terms of which hosted virtual machine instances will be migrated and the timing of the migration, at (2), the migration management service 112 transmits commands, or causes the transmission of commands, in order to cause the migration of the data associated with one or more hosted virtual machine instances according to the determined parameters.

With continued reference to FIG. 3B, for purposes of an illustrative example, assume the physical computing device 110a then receives and executes migration commands in order to cause the migration of hosted virtual machine instances 108a and 108b. In some embodiments, the migration management service 112 may incorporate the necessary functionality to migrate hosted virtual machine instances 108 directly, or to monitor and control the migration of virtual machine instances directly. However, one of ordinary skill in the art will appreciate that it is not necessary that the migration management service 112 directly incorporate such functionality. Accordingly, in some embodiments, the migration management service 112 may cause the migration of virtual machine instances via other components of the hosting service provider 102 or via components not controlled by the hosting service provider 102. The migration management service 112 may cause such migration, for example, by transmitting migration commands to migration software or systems. In still more embodiments, the monitoring and control of a migration may also be implemented through use of other virtual network components, such as migration software or systems.

In an illustrative embodiment, the migration management service 112 may cause the migration of the hosted virtual machine instances 108 in a manner to minimize the amount of time the hosted virtual machine instances 108 are unavailable to client computing devices 102. In this embodiment, the migration management service 112 will attempt to create a binary copy of the data maintained or utilized by hosted virtual machine instance 108 to be migrated. If a copy can be made, the migration management service 112 then determines an appropriate time to halt further operations of the hosted virtual machine instance 108. The migration management service 112 will then compare the data associated with the halted hosted virtual machine instance 108 with the binary copy that was previously created. The migration management service 112 will then update the binary copy if any changes are detected. Thereafter, the updated binary copy can be incorporated or otherwise implemented by a new instantiated hosted virtual machine instance 108.

With reference now to FIG. 3C, a simplified block diagram illustrating the results of the executed migration commands is shown. The data associated with hosted virtual machine instances 108a, 108b, have been migrated to instantiated virtual machine instances hosted on physical computing device 110b while the hosted virtual machine instance 108c remains on physical computing device 110a. Illustratively, physical computing device 110b may be considered a stand-alone physical computing device that is capable of hosting the migrated virtual machine instances 108a and 108b. One skilled in the relevant art will appreciate that hosted virtual machine instances 108a and 108b may remain instantiated on the physical computing device 110a or may be terminated. For purposes of the present application, however, the hosted virtual machine instances are not illustrated in FIG. 3C to illustrate the migration of the data.

In one embodiment, the migration management service 112 may also integrate with various accounting or financial services to cause an event associated with the migration of hosted virtual machine instances 108. For example, the migration management service 112 can cause customers associated with the migrated hosted virtual machine instances to pay higher fees associated with hosting the migrated virtual machine instances in a different or isolated physical computing device 110b. In another example, the migration management service 112 can cause modifications to the service level agreements for the customers associated with the migrated hosted virtual machine instances. In still a further example, the migration management service 112 can cause the initiation of an audit or follow up to determine causes for the migration or to attempt to correct any errors associated with the migrated hosted virtual machine instances.

Figure 4:
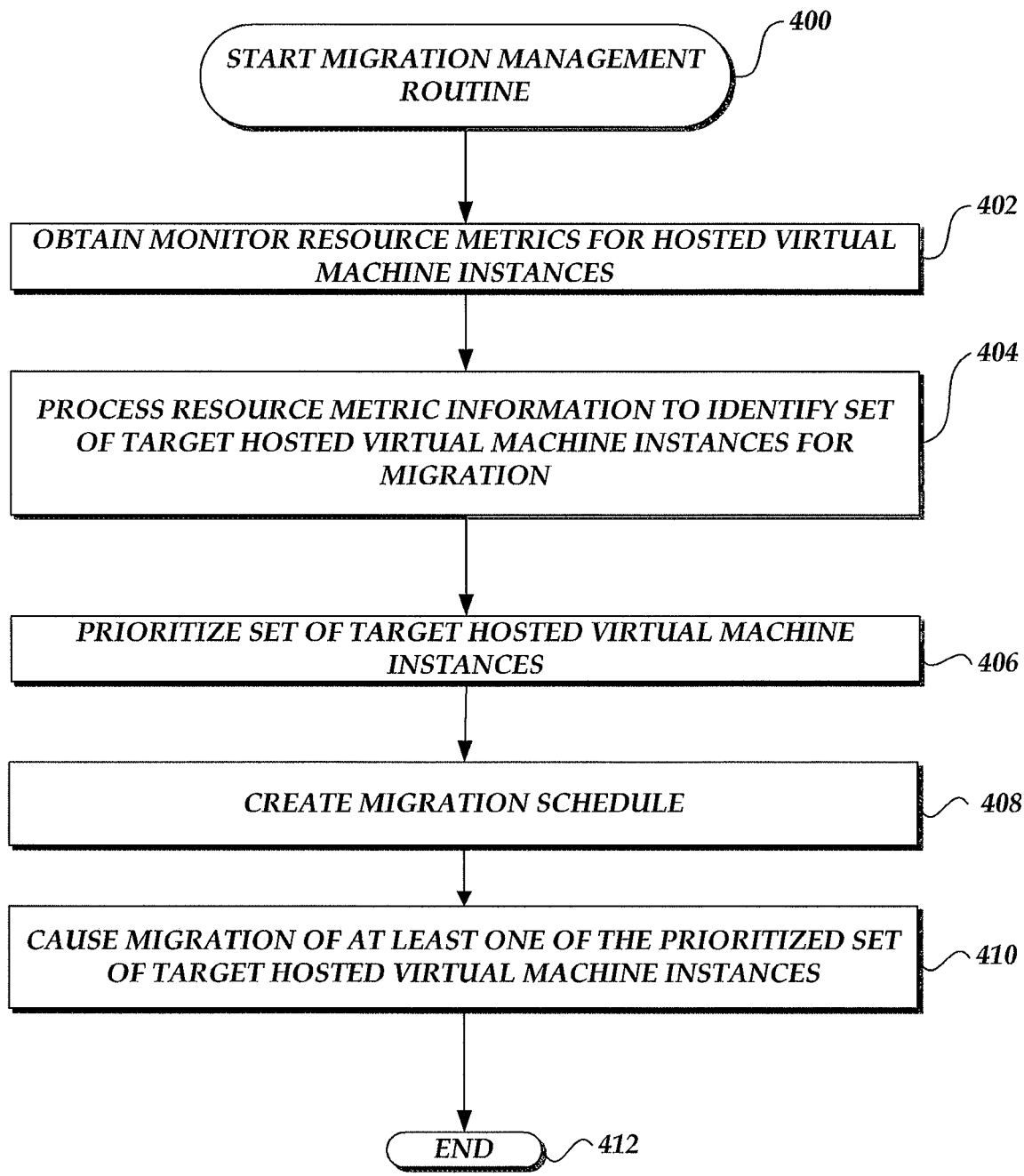
FIG. 4 is a flow-diagram illustrating a migration managing routine implemented by a hosted virtual machine management component.

With reference now to FIG. 4, an illustrative flow-diagram depicting a routine 400 for the management of hosted virtual machine instance is depicted. This routine may be carried out by, for example, a migration management service 112 of FIG. 1. At block 404, the migration management service 112 monitors the resource metrics of one or more hosted virtual machine instances 108. As described above, the monitored metrics may correspond to database functionality provided by each hosted virtual machine instance 108. Examples include, but are not limited to, the determination of the type and frequency of database queries received by a hosted virtual machine instance. In another example, the monitored metrics may correspond to the origination of database queries. One skilled in the relevant art will appreciate however, that additional or alternative monitored resources may be utilized.

At block 404, the migration management service 112 can process the received hosted virtual machine metric information. In one aspect, the migration management service 112 can collect additional information related to resource consumption of the physical computing device 110 hosting the hosted virtual machine instances. In another aspect, the migration management service 112 can further identify other contextual information associated with the hosted virtual machine instance(s) 108, such as customer identifiers, time of day, historical behavior. Still further, in another aspect, the migration management service 112 can obtain additional information related to other hosted virtual machine instances, such base line performance information. One skilled in the relevant art will appreciate that additional processing may also be possible.

At block 406, the migration management service 112 processes the set to generate a prioritized set of target hosted virtual machine instances. In one aspect, the prioritization of the hosted virtual machine instances may be based on comparison of recorded metric information. For example, the migration management service 112 may apply a separate threshold for identifying target hosted virtual machine instances for migration. In another aspect, the prioritization of the set of target hosted virtual machine instances may be based on consideration of additional information, such as customer identification or service level agreements. For example, the migration management service 112 may prioritize hosted virtual machine instances that are associated with a customer that has previously been associated with migration(s).

In another example, the migration management service 112 may prioritize hosted virtual machine instances based on agreed upon service level agreements, including a maximum amount of resource usage agreed to by the customer. In a further example, the migration management service 112 may prioritize hosted virtual machine instances that are associated with service level agreements for other hosted virtual machine instances. In this example, a hosted virtual machine instance that is consuming resources in a manner that would cause the migration management service 112 to violate service level agreements provided to other hosted virtual machine instances 108 on the same physical machine may be targeted for migration.

In another embodiment, the migration management service 112 can incorporate additional manual input regarding the prioritization of the targeted hosted virtual machine inputs. In this embodiment, the migration management service 112 may generate interfaces related to the set of target hosted virtual machines instances to obtain input from users regarding prioritization. For example, the migration management service 112 can generate, or cause to be generated, an interface that allows manual manipulation of one or more of the hosted virtual machine instances via an input device, such as mouse, keyboard, touchscreen, etc.

At block 408, a migration schedule is created according to the monitored resource usage of the virtual machine instances and the estimated effects of individual migrations. At block 410, the migration of the virtual machine instances is caused according to the prioritized set of hosted virtual machines instances. Illustratively, these migrations may be accomplished according to various migration types. For example, migrations may occur via a copy-on-write process, in order to minimize downtime of a virtual machine. In some embodiments, migration may occur by shutting down a virtual machine instance in order to directly copy all needed information to a new physical machine. In other embodiments, the migration management service 112 will attempt to create a binary copy of the hosted virtual machine instance 108 to be migrated. At block 412, the routine 408 terminates.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
a computer system executing software code to:
monitor at least one resource usage metric of each hosted virtual machine instance of a plurality of hosted virtual machine instances hosted on at least one physical computing system;
determine, based on the at least one resource usage metric of each hosted virtual machine instance of the plurality of virtual machine instances, a migration set of target hosted virtual machine instances from the plurality of hosted virtual machine instances targeted for migration;
determine a migration prioritization of each respective target hosted virtual machine instance within the migration set of target hosted virtual machine instances to generate a prioritized migration set of target hosted virtual machine instances based at least in part on the at least one resource usage metric of each target hosted virtual machine instance within the migration set of target hosted virtual machine instances;
wherein the migration prioritization is based at least in part on a predicted impact of each respective at least one resource usage metric on a respective minimum service level associated with each respective hosted virtual machine instance of the plurality of hosted virtual machine instances according to a comparison between the at least one resource usage metric and each minimum service level; and
cause at least a portion of data associated with at least one of the target hosted virtual machine instances to be migrated according to the prioritized set of target hosted virtual machine instances.

2. The system of claim 1, wherein the at least one resource usage metric include a type and frequency of database queries.

3. The system of claim 1, wherein the computer system determines the migration set of target hosted virtual machine instances for migration by applying at least one threshold associated with the at least one resource usage metric.

4. The system of claim 3, wherein at least one threshold includes a total number of connections to the computer system.

5. The system of claim 1, wherein the computer system prioritizes the migration set of target hosted virtual machine instances for migration based on at least one threshold associated with the at least one resource usage metric.

6. The system of claim 1, wherein the computer system prioritizes the migration set of target hosted virtual machine instances for migration based on a customer associated with at least one hosted virtual machine instance in the migration set of target hosted virtual machine instances.

7. The system of claim 1, wherein causing the migration of the prioritized migration set of target hosted virtual machine instances includes creating a binary copy of data associated with a hosted virtual machine instance in the prioritized migration set of target hosted virtual machine instances.

8. The system of claim 1, wherein at least one respective virtual machine instance is migrated to a respective physical computing device hosting no additional virtual machine instances.

9. A method, comprising:
monitoring at least one resource usage metric of a hosted virtual machine instance of a plurality of hosted virtual machine instances hosted on at least one physical computing system;
determining a migration prioritization of the hosted virtual machine instance within a migration set of target hosted virtual machine instances based at least in part on the at least one resource usage metric of each target hosted virtual machine instance within the migration set of target hosted virtual machine instances;
wherein the migration prioritization is based at least in part on a predicted impact of the at least one resource usage metric on a respective minimum service level associated with each respective target hosted virtual machine instance of the migration set of target hosted virtual machine instances according to a comparison between the at least one resource usage metric and each minimum service level; and
causing at least a portion of data associated with the hosted virtual machine instance to be migrated according to the migration prioritization.

10. The method of claim 9, wherein the at least one resource usage metric include a type and frequency of database queries.

11. The method of claim 9, including determining the migration set of target hosted virtual machine instances for migration by applying at least one threshold associated with the at least one resource usage metric.

12. The method of claim 11, wherein at least one threshold includes a total number of network connections.

13. The method of claim 9, wherein determining the migration prioritization of the hosted virtual machine instance includes prioritizing the hosted virtual machine instance based on at least one threshold associated with the at least one resource usage metric.

14. The method of claim 9, wherein determining the migration prioritization of the hosted virtual machine instance includes prioritizing the hosted virtual machine instance based on a customer associated with the hosted virtual machine instance.

15. The method of claim 9, including creating a binary copy of data associated with the hosted virtual machine instance before causing at least a portion of data associated with the hosted virtual machine instance to be migrated according to the migration prioritization of the hosted virtual machine instances.

16. A method, comprising:
monitoring at least one resource usage metric of a hosted virtual machine instance of a plurality of hosted virtual machine instances hosted on at least one physical computing system;
determining a migration prioritization of the hosted virtual machine instance within a migration set of target hosted virtual machine instances based at least in part on the at least one resource usage metric associated with the hosted virtual machine instance:
wherein the migration prioritization is based at least in part on a comparison between the at least one resource usage metric and a threshold associated with the hosted virtual machine instance; and
causing at least a portion of data associated with the hosted virtual machine instance to be migrated according to the migration prioritization.

17. The method of claim 16, wherein the at least one resource usage metric include a type and frequency of database queries.

18. The method of claim 16, wherein determining the migration prioritization of the hosted virtual machine instance includes prioritizing the hosted virtual machine instance based on a customer associated with the hosted virtual machine instance.

19. The method of claim 16, including creating a binary copy of data associated with the hosted virtual machine instance before causing at least a portion of data associated with the hosted virtual machine instance to be migrated according to the migration prioritization of the hosted virtual machine instances.

* * * * *